United States Patent
Mattioli et al.

(10) Patent No.: US 12,391,291 B2
(45) Date of Patent: Aug. 19, 2025

(54) DUAL GAUGE RAIL WHEEL ASSEMBLY

(71) Applicant: Zephir S.p.A., Modena (IT)

(72) Inventors: Marco Mattioli, Soliera (IT); Marco Malagoli, Modena (IT)

(73) Assignee: Zephir S.p.A., Modena (IT)

( * ) Notice: Subject to any disclaimer, the term of this patent is extended or adjusted under 35 U.S.C. 154(b) by 917 days.

(21) Appl. No.: 17/474,826

(22) Filed: Sep. 14, 2021

(65) Prior Publication Data
US 2022/0324493 A1 Oct. 13, 2022

Related U.S. Application Data

(60) Provisional application No. 63/173,667, filed on Apr. 12, 2021.

(51) Int. Cl.
*B61F 7/00* (2006.01)
*B60B 17/00* (2006.01)
*B60B 37/00* (2006.01)

(52) U.S. Cl.
CPC .............. *B61F 7/00* (2013.01); *B60B 17/00* (2013.01); *B60B 37/00* (2013.01)

(58) Field of Classification Search
CPC . B61F 7/00; B61F 15/08; B60B 17/00; B60B 37/00
USPC ........................................................ 105/178
See application file for complete search history.

(56) References Cited

U.S. PATENT DOCUMENTS

| 118,065 A | 8/1871 | Snow | |
|---|---|---|---|
| 1,315,672 A * | 9/1919 | Kleinschmidt | C21C 5/44 |
| | | | 105/178 |
| 4,942,826 A * | 7/1990 | Erickson | B61D 15/12 |
| | | | 105/178 |
| 6,457,419 B1 * | 10/2002 | Lopez Gomez | B61F 7/00 |
| | | | 105/157.1 |
| 6,561,104 B2 * | 5/2003 | Nast | B61C 9/52 |
| | | | 105/178 |

(Continued)

FOREIGN PATENT DOCUMENTS

| CN | 108 909 354 B | 5/2020 |
|---|---|---|
| EP | 0 747 278 A1 | 11/1996 |
| EP | 0 802 101 A2 | 10/1997 |

OTHER PUBLICATIONS

International Search Report issued in PCT/IB2021/058385 on Jan. 25, 2022.

*Primary Examiner* — Zachary L Kuhfuss
(74) *Attorney, Agent, or Firm* — Arnold & Porter Kaye Scholer LLP

(57) ABSTRACT

A rail wheel assembly is disclosed herein that is configured to operate on rail networks with multiple railway track gauges. In various embodiments, the dual gauge rail wheel assembly may comprise an axle extension component that is affixed to an axle of a railway vehicle and configured to receive a sliding wheel. The axle extension component may comprise sets of holes or slots located at different positions and corresponding to different railway track gauges. The sliding wheel may be configured to slide axially on the axle extension component between the different sets of holes or slots on the axle extension component. When holes or slots on the sliding wheel and the axle extension component are aligned, locking pins or a locking key may be inserted into the aligned holes or slots to secure the sliding wheel in a position corresponding with a particular railway track gauge.

19 Claims, 9 Drawing Sheets

(56) References Cited

U.S. PATENT DOCUMENTS

2011/0265682 A1\* 11/2011 Lopez ..................... B61F 7/00
　　　　　　　　　　　　　　　　　　　　　　　105/178

\* cited by examiner

DUAL GAUGE RAIL WHEEL ASSEMBLY

RELATED APPLICATIONS

This application claims priority to U.S. Provisional Patent Application No. 63/173,667, filed Apr. 12, 2021, the content of which is incorporated herein by reference in its entirety.

FIELD OF THE INVENTION

The present invention relates to the railway industry and, more particularly, to a rail wheel assembly configured to operate on rail networks with multiple railway track gauges.

BACKGROUND OF THE INVENTION

A railway track gauge refers to the spacing of the rails on a railway track and is expressed in terms of the distance between the inner faces of the load-bearing rails. A number of different standard railway track gauges are utilized by different railway systems based on the country or geographic region in which the railway system is located. For example, a railway gauge of 1,435 mm—often referred to as the "standard gauge" (or "European gauge")—is the most widely used railway track gauge and has been adopted by most European countries. The majority of railways in Spain and Portugal, however, utilize a railway gauge of 1,668 mm, which is often referred to as the "Iberian gauge."

Railway vehicles are typically designed to operate on a railway with a single railway track gauge. As such, it may not be possible for a railway vehicle designed to operate on one rail gauge network to operate in another geographic region or even a neighboring country. For example, a railway vehicle designed to operate in most European countries (e.g., France and Germany) may not be able to operate in Spain or Portugal. When trains, for example, arrive at a break of gauge (i.e., where a line of one gauge meets a line of a different gauge), passengers may need to change from one train to a train configured to operate on the new gauge and/or freight on the train may need to be transshipped (i.e., transferred from one mode of transportation to another). This often results in added delay, inconvenience, and cost.

Conventional solutions to the problems posed by the use of different railway track gauges suffer from various drawbacks. One common solution is to build cars to the smaller of the two systems' loading gauges with bogies that are easily removed and replaced with other bogies at an interchange location on the border. A bogie is a chassis or framework attached to a vehicle that carries a wheelset. While this solution may only take a few minutes, it requires swapping an entire bogie and must be done at a specific interchange location. Another solution is to utilize bogies with variable gauge wheelsets whose wheels can be moved inward and outward. While this solution does not require bogies to be replaced, special equipment at a gauge changing facility is still required to unlock the wheels and push them inward or outward. As such, there is a need for a wheel design that does not require special equipment at a gauge changing facility or interchange location to allow a railway vehicle (such as a railcar mover) to efficiently operate on multiple different rail gauge networks.

SUMMARY OF THE INVENTION

Aspects of this disclosure relate to a rail wheel assembly configured to operate on rail networks with multiple railway track gauges. For example, the dual gauge rail wheel assembly described herein may be configured to enable a rail wheel to shift between at least two positions to enable the vehicle on which it is affixed to operate on at least two different railway track gauges. In various embodiments, the dual gauge rail wheel assembly may comprise an axle extension component that is affixed to an axle of a railway vehicle and configured to receive a sliding wheel. The axle extension component may comprise sets of holes or slots that correspond to different railway track gauges. For example, a first set of holes or slots may correspond to a first position associated with a first railway track gauge and a second set of holes or slots may correspond to a second position associated with a second railway track gauge. In an example embodiment, the first railway track gauge may comprise the standard gauge (or European gauge) and the second railway track gauge may comprise the Iberian gauge. The sliding wheel may be configured to slide axially on the axle extension component between the positions associated with the different railway track gauges. When holes or slots on the sliding wheel are aligned with the set of holes or slots on the axle extension component corresponding to the first position or the second position, the sliding wheel may be secured to the axle extension component by inserting locking pins or a locking key into both the holes or slots on the sliding wheel and the aligned holes or slots on the axle extension component.

These and other objects, features, and characteristics of the invention disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized, and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

Figure 1:
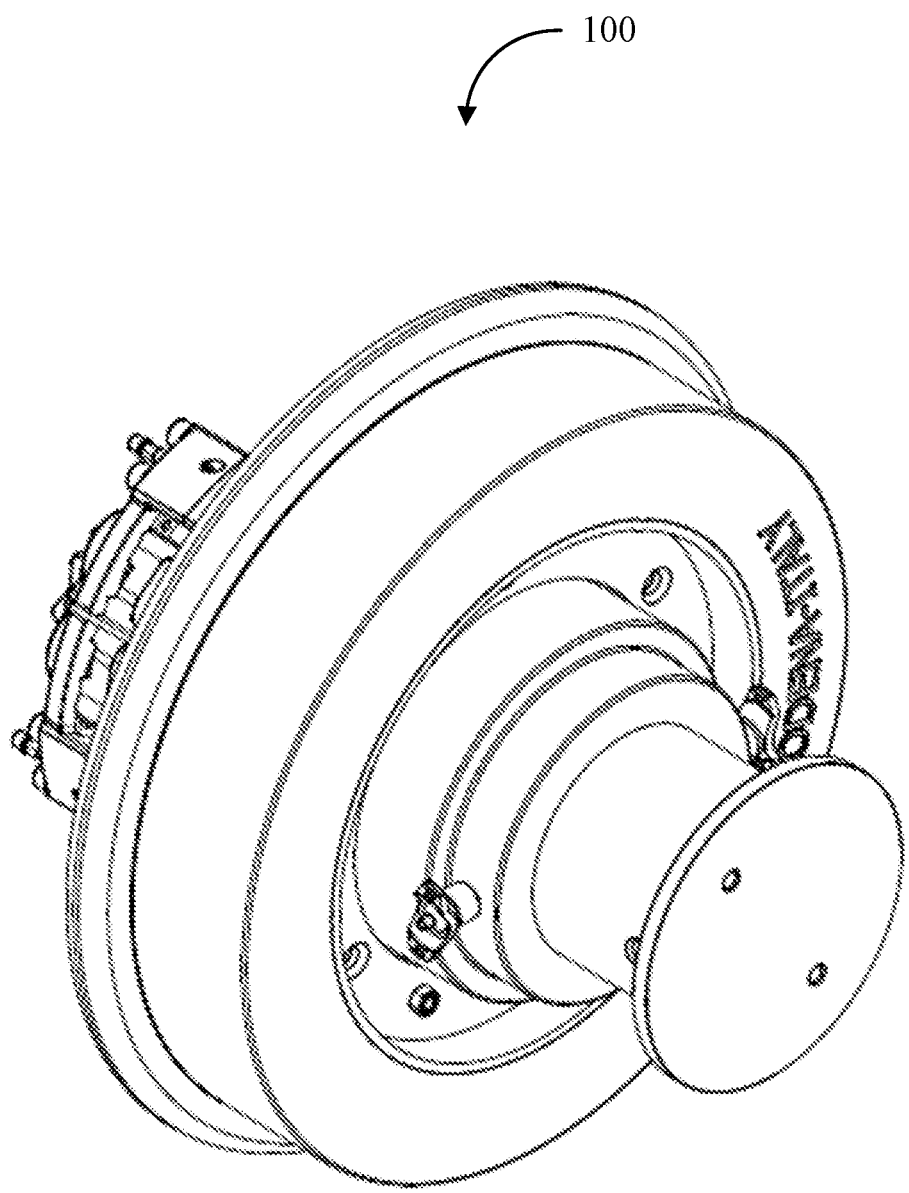
FIG. 1 depicts a perspective view of an example dual gauge rail wheel assembly, according to one or more aspects described herein.

The invention described herein relates to a rail wheel assembly configured to operate on multiple different rail gauge networks. For example, FIG. 1 depicts a perspective view of dual gauge rail wheel assembly 100, according to one or more aspects described herein. The dual gauge rail wheel assembly described herein may be configured to enable the rail wheel to shift between two or more positions to enable the vehicle on which it is affixed to operate on two or more different railway track gauges. In various embodiments, the dual gauge rail wheel assembly described herein may be interchangeable with a standard rail wheel (e.g., a rail wheel for a model CRAB) and may be similarly mounted on a standard rail axle or other rail axle. For example, the dual gauge rail wheel assembly described herein may be mounted on a rail axle the same as or similar to rail axle 300 depicted in FIG. 13 and described herein.

In various implementations, the dual gauge rail wheel assembly described herein (e.g., dual gauge rail wheel assembly 100, dual gauge rail wheel assembly 200, and/or a dual gauge rail wheel assembly comprising one or more components or features of dual gauge rail wheel assembly 100 and/or dual gauge rail wheel assembly 200) may comprise an axle extension component affixed to an axle of a railway vehicle and a sliding wheel configured to slide axially on the axle extension component between at least a first position associated with a first railway track gauge and a second position associated with a second railway track gauge. In various implementations, the sliding wheel may be locked into place via a mechanical locking device. As described herein, the mechanical locking device may comprise a set of locking pins, a locking key, and/or one or more other mechanical locking devices. For example in some implementations, the mechanical locking device may comprise a set of locking pins that are each configured to be inserted into both a hole on the sliding wheel and a hole on the axle extension component when the holes are aligned. In other implementations, the mechanical locking device may comprise a locking key configured to be inserted into both a set of slots on the sliding wheel and a set of slots on the axle extension component when the two sets of slots are aligned.

In various implementations, a dual gauge rail wheel assembly as described herein (e.g., dual gauge rail wheel assembly 100, dual gauge rail wheel assembly 200, and/or a dual gauge rail wheel assembly comprising one or more components or features of dual gauge rail wheel assembly 100 and/or dual gauge rail wheel assembly 200) may be affixed to one or more types of railway vehicles. For example, a dual gauge rail wheel assembly as described herein may be affixed to a railcar mover and/or one or more other types of railway vehicles (including various types of carriages, trailers, trucks, wagons, etc.). In various implementations, a railway vehicle as referred to herein may comprise any vehicle, car, or device configured to operate on a set of tracks. For example, in some implementations, the dual gauge rail wheel assembly described herein may be affixed to an overhead crane or other port crane that is transported via tracks.

Figure 2B:
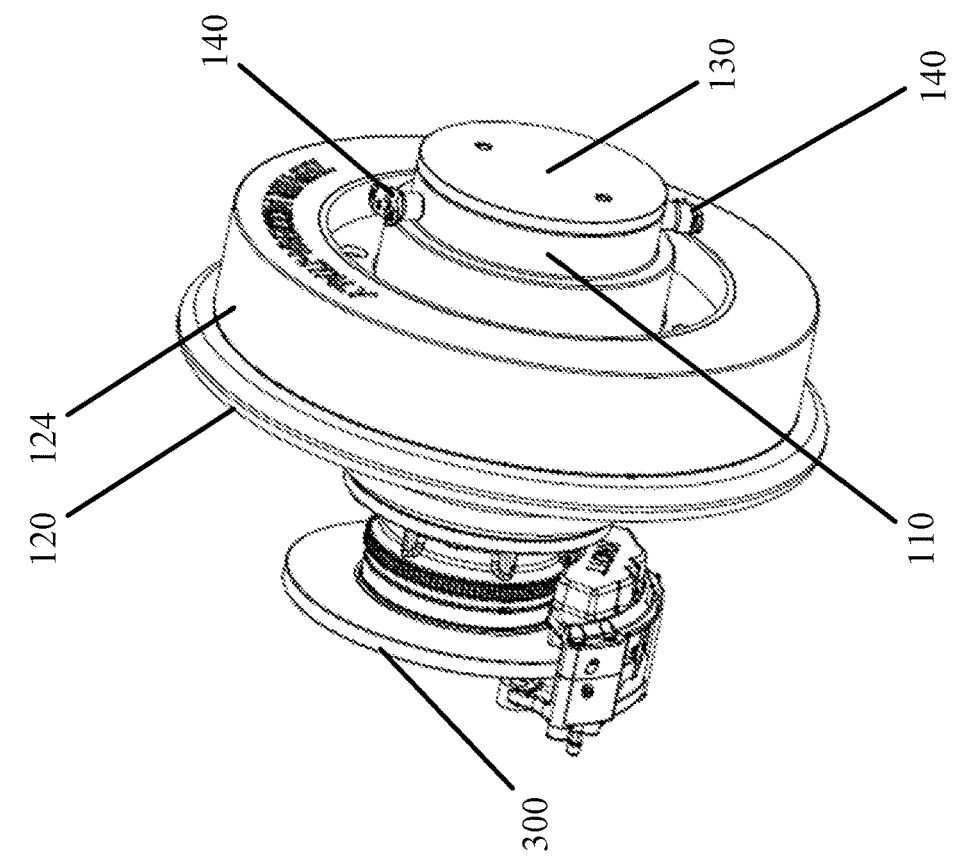
FIG. 2A and FIG. 2B depict perspective views of an example dual gauge rail wheel assembly in a first position and a second position, according to one or more aspects described herein.
Figure 2A:
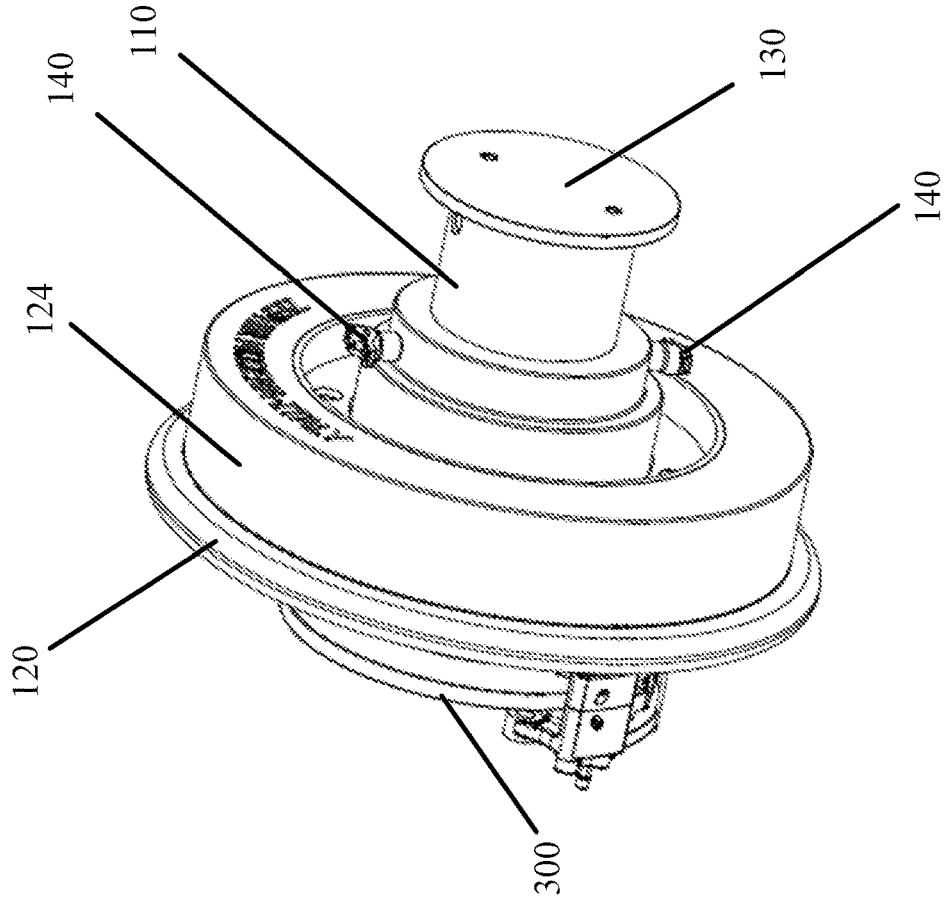

FIG. 2A and FIG. 2B depict perspective views of dual gauge rail wheel assembly 100 depicted in FIG. 1 in a first position and a second position, according to one or more aspects described herein. In various embodiments, assembly 100 may include axle extension component 110, sliding wheel 120, wheel cover 130, one or more locking pins 140, and/or one or more other components. In various embodiments, assembly 100 may be configured to be mounted on axle 300. In various embodiments, sliding wheel 120 may include a rubber ring 124. In various embodiments, rubber ring 124 may comprise a replaceable rubber wheel. When assembly 100 is affixed to a railcar via axle 300, the weight of the railcar may sit on rubber ring 124.

In various embodiments, the components of assembly 100 may enable sliding wheel 120 to shift between two or more positions to enable the vehicle on which it is affixed to operate on two or more different railway track gauges. For example, sliding wheel 120 may be configured to shift between at least a first position associated with a first railway track gauge (e.g., standard or European gauge) and a second position associated with a second railway track gauge (e.g., Iberian gauge). In an example implementation, sliding wheel 120 may be fixed in a first position associated with a first railway track gauge when slid inward closer to axle 300 (as depicted in FIG. 2A) or may be fixed in a second position associated with a second railway track gauge when slid outward and positioned further away from axle 300 (as depicted in FIG. 2B). Sliding wheel 120 may be secured to assembly 100 in the first position or second position, for example, by inserting locking pin(s) 140 into one or more pin holes 126 when one or more pin holes 126 are aligned with appropriate pin hole(s) of two or more pin holes 114. In some embodiments, sliding wheel 120 may also be secured via one or more other mechanisms as described herein or as otherwise known in the art.

In order to shift sliding wheel from one position to a different position, locking pin(s) 140 may be removed from assembly 100. For example, locking pin(s) 140 may be pulled out of pin hole(s) 114 on axle extension component 110 and pin hole(s) 126 on sliding wheel 120. Sliding wheel 120 may then be slid to a different position. For example, sliding wheel 120 may be slid axially (e.g., on axle extension component 110) from a first position associated with a first railway track gauge (as depicted in FIG. 2A) to a second position associated with a second railway track gauge (as depicted in FIG. 2B). When shifted to a different position, sliding wheel 120 may again be secured by inserting locking pin(s) 140 into pin hole(s) 126 when pin hole(s) 126 are aligned with the pin hole(s) of two or more pin holes 114 that correspond to the appropriate position (or railway track gauge). The components of assembly 100 are described further herein with respect to FIGS. 3-6.

Figure 3:
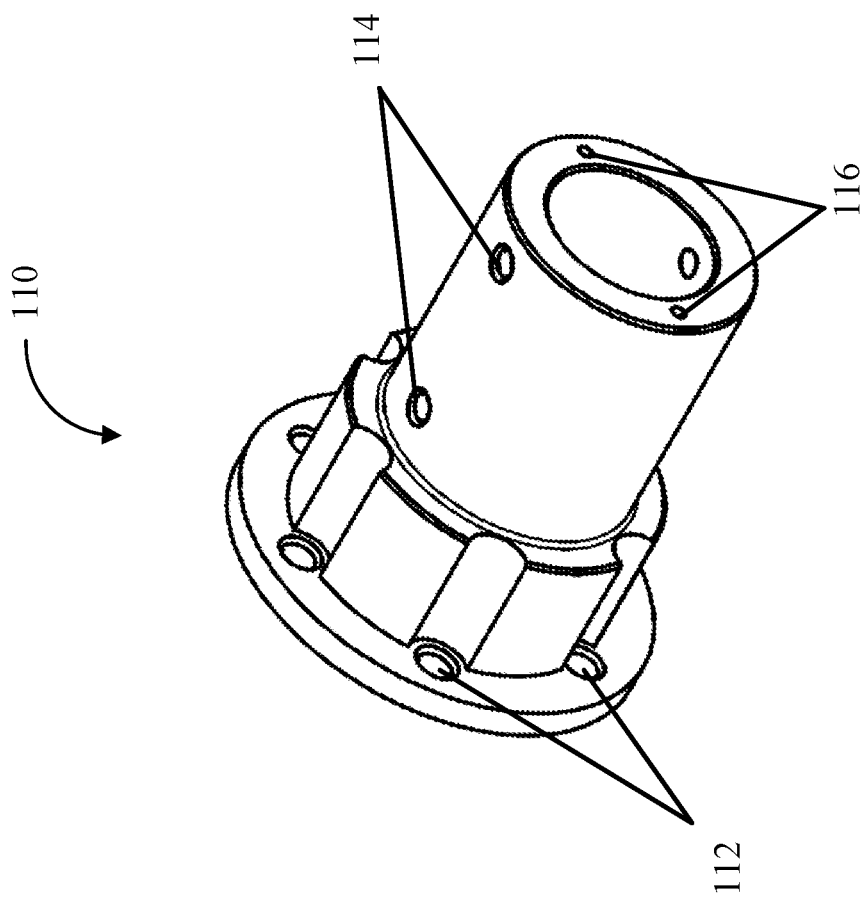
FIG. 3 depicts a perspective view of an example axle extension component of a dual gauge rail wheel assembly, according to one or more aspects described herein.

FIG. 3 depicts a perspective view of axle extension component 110 of dual gauge rail wheel assembly 100, according to one or more aspects described herein. In various embodiments, axle extension component 110 may include one or more axle connection holes 112, two or more pin holes 114 (which may also be referred to herein as "axle pin holes 114"), one or more cover holes 116, and/or one or more other components. In various embodiments, axle extension component 110 may comprise an internal component of assembly 100 that is configured to attach assembly 100 to axle 300. In various embodiments, axle extension component 110 may be configured to attach to axle 300 via one or more axle connection holes 112. For example, one or more axle connection holes 112 may align with a plurality of holes on axle 300 to form a plurality of holes via which assembly 100 may be bolted to axle 300. In various embodiments, two or more pin holes 114 may comprise two or more sets of pin holes. In some embodiments, each set of pin holes may include a two pin holes located on opposite sides of axle extension component 110. In various embodiments, each pin holes 114 may be configured to receive a locking pin 140. In various embodiments, a first set of pin holes 114 may be configured to correspond to a first position associated with a first railway track gauge (e.g., standard or European gauge), and a second set of pin holes 114 may be configured to correspond to a second position associated with a second railway track gauge (e.g., Iberian gauge). In various embodiments, axle extension component 110 may be configured to receive sliding wheel 120, wheel cover 130, one or more locking pins 140, and/or one or more other components. For example, axle extension component 110 may be configured to receive at least sliding wheel 120, wheel cover 130, and one or more locking pins 140 as described further herein with respect to at least FIGS. 4-6.

Figure 4:
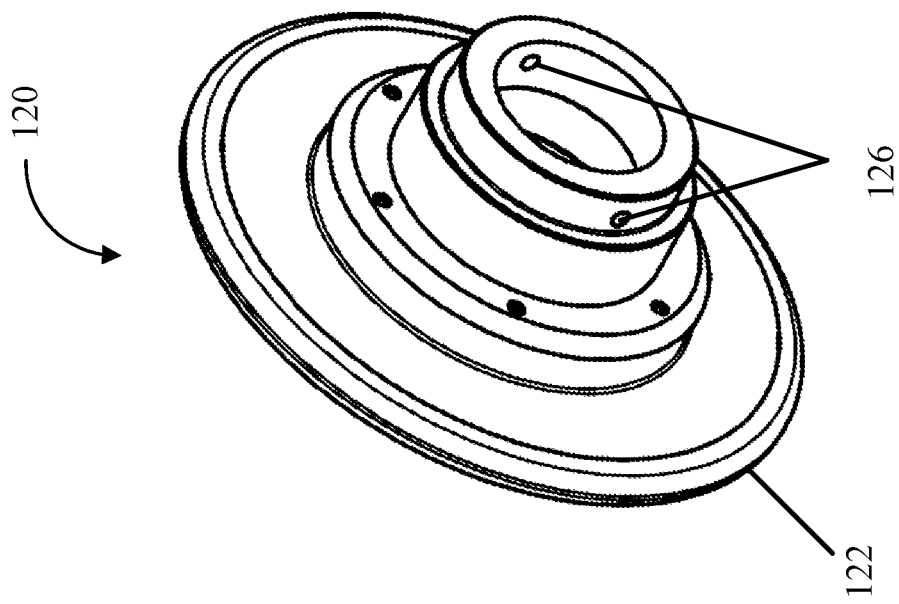
FIG. 4 depicts a perspective view of an example sliding wheel of a dual gauge rail wheel assembly, according to one or more aspects described herein.

FIG. 4 depicts a perspective view of sliding wheel 120 of dual gauge rail wheel assembly 100, according to one or more aspects described herein. In various embodiments, sliding wheel 120 may include metal ring 122, rubber ring 124 (not pictured), one or more pin holes 126 (which may also be referred to herein as "wheel pin holes 126"), and/or one or more other components. As described herein, sliding wheel 120 may comprise a traction wheel, a free wheel, and/or any other type of wheel configured to operate on a set of tracks. In various embodiments, sliding wheel 120 may be slid onto axle extension component 110 at an end of axle extension component 110 opposite axle 300. For example, an internal diameter of sliding wheel 120 may correspond to (or be roughly equivalent to) an external diameter of axle extension component 110 at an end of axle extension component 110 opposite axle 300 to enable axle extension component 110 to receive sliding wheel 120. As described herein, rubber ring 124 may comprise a replaceable rubber wheel. In various embodiments, rubber ring 124 may be fixed on sliding wheel 120 and comprise the part of assembly 100 that carries weight of railcar when assembly 100 is affixed to a railcar via axle 300. In various embodiments, one or more pin holes 126 may be configured to receive one or more locking pins 140. As described herein, one or more pin holes 126 may be aligned with pin hole(s) of two or more pin holes 114 that correspond to a first position associated with a first railway track gauge (e.g., standard or European gauge) to secure sliding wheel 120 in the first position via one or more locking pins 140, or aligned with pin hole(s) of two or more pin holes 114 that correspond to a second position associated with a second railway track gauge (e.g., Iberian gauge) to secure sliding wheel 120 in the second position via one or more locking pins 140.

Figure 5:
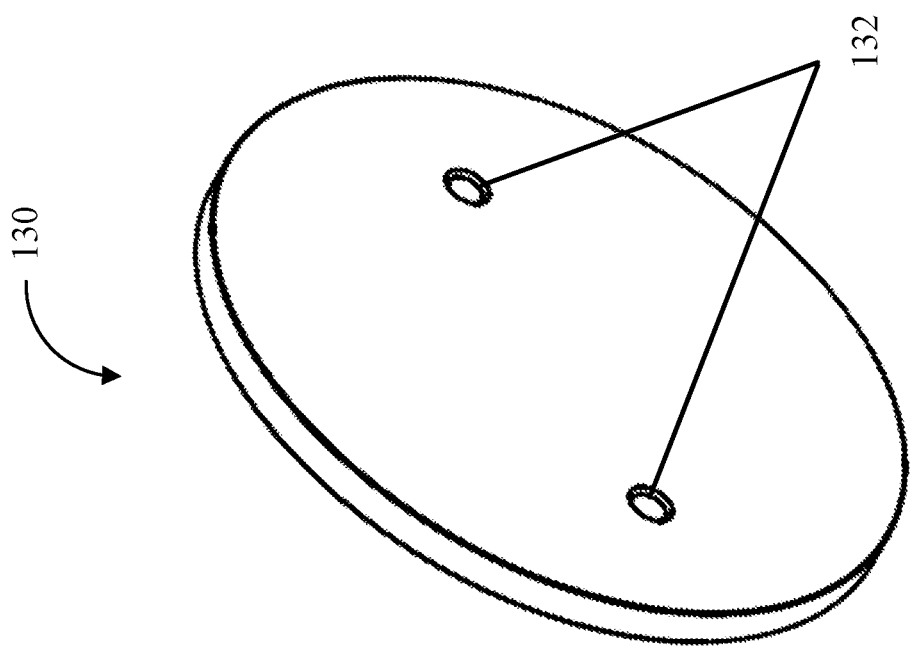
FIG. 5 depicts a perspective view of an example wheel cover of a dual gauge rail wheel assembly, according to one or more aspects described herein.

FIG. 5 depicts a perspective view of wheel cover 130 of dual gauge rail wheel assembly 100, according to one or more aspects described herein. In various embodiments, wheel cover 130 may include one or more holes 132 and/or one or more other components. In various embodiments, wheel cover 130 may comprise an external component of assembly 100 opposite axle 300. In various embodiments, wheel cover 130 may be affixed to axle extension component 110 via one or more cover holes 116 located at an end of axle extension component 110 opposite axle 300. For example, one or more holes 132 of wheel cover 130 may be aligned with one or more cover holes 116 to affix wheel cover 130 to axle extension component 110. In various embodiments, wheel cover 130 may be configured to secure one or more components of sliding wheel 120 to assembly 100 and/or protect internal components of assembly 100 or axle 300.

Figure 6:
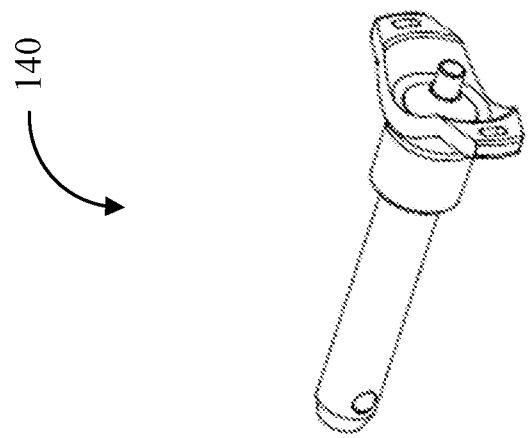
FIG. 6 depicts a perspective view of an example locking pin of a dual gauge rail wheel assembly, according to one or more aspects described herein.

FIG. 6 depicts a perspective view of a locking pin 140 of dual gauge rail wheel assembly 100, according to one or more aspects described herein. In various embodiments, locking pin 140 may be configured to be inserted through at least one or more pin holes 126 of sliding wheel 120 and two or more pin holes 114 of axle extension component 110. As described herein, one or more locking pins 140 may be utilized to secure sliding wheel 120 in a first position associated with a first railway track gauge (e.g., standard or European gauge) when one or more pin holes 126 are aligned with pin hole(s) of two or more pin holes 114 that correspond to the first railway track gauge, and may be utilized to secure sliding wheel 120 in a second position associated with a second railway track gauge (e.g., Iberian gauge) when one or more pin holes 126 are aligned with pin hole(s) of two or more pin holes 114 that correspond to the second railway track gauge.

Figure 7B:
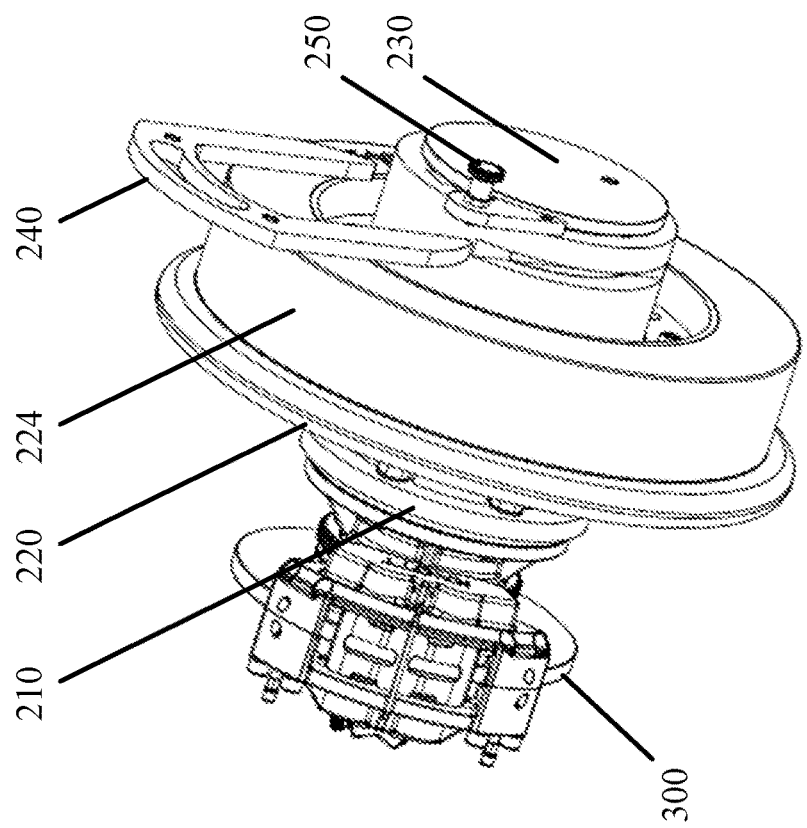
FIG. 7A and FIG. 7B depict perspective views of an example dual gauge rail wheel assembly with a locking key, according to one or more aspects described herein.
Figure 7A:
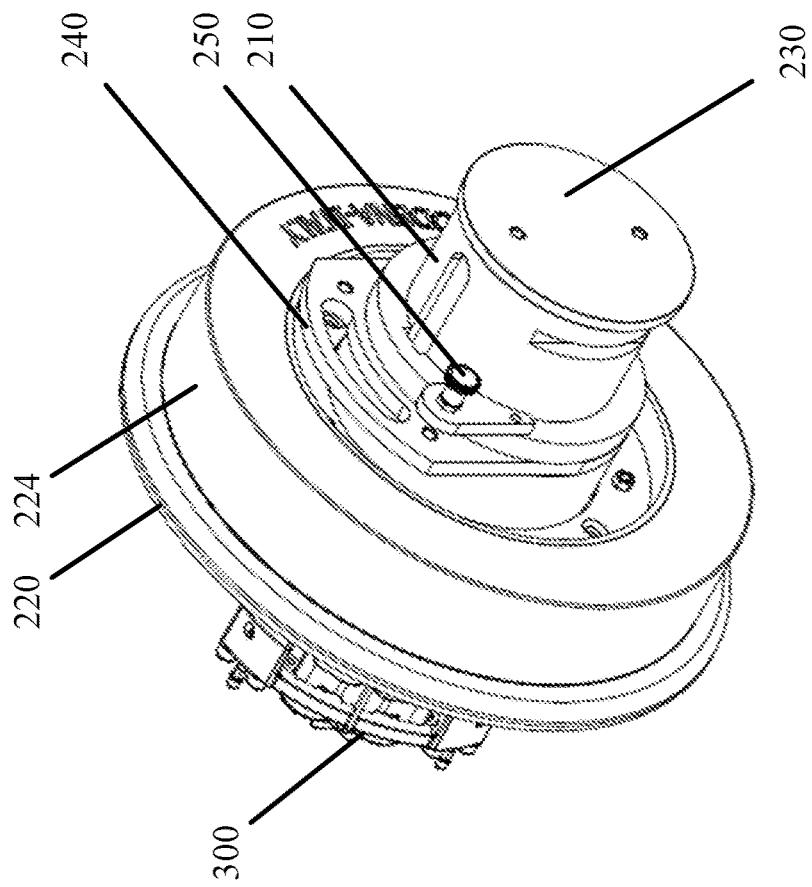

In various embodiments, one or more other mechanisms may be utilized to secure a sliding wheel in one of two or more positions on a dual gauge rail wheel assembly associated with different railway track gauges. For example, FIG. 7A and FIG. 7B depict perspective views of a dual gauge rail wheel assembly 200 configured to utilize a locking key, according to one or more aspects described herein. In various embodiments, assembly 200 may include axle extension component 210, sliding wheel 220, wheel cover 230, locking key 240, safety pin 250, and/or one or more other components. In various embodiments, the components of assembly 200 may be configured to function the same as or substantially similar to corresponding components of assembly 100, as described further herein. For example, similar to sliding wheel 120 described herein with respect to FIG. 2A and FIG. 2B, sliding wheel 220 may include a rubber ring 224 comprising a replaceable rubber wheel configured to carry the weight of the railcar when assembly 200 is affixed to the railcar via axle 300.

In various embodiments, the components of assembly 200 may enable sliding wheel 220 to shift between two or more positions to enable the vehicle on which it is affixed to operate on two or more different railway track gauges. For example, sliding wheel 220 may be configured to shift between at least a first position associated with a first railway track gauge (e.g., standard or European gauge) and a second position associated with a second railway track gauge (e.g., Iberian gauge). In an example implementation, sliding wheel 220 may be fixed in a first position associated with a first railway track gauge when slid inward closer to axle 300 (as depicted in FIG. 7A) or may be fixed in a second position associated with a second railway track gauge when slid outward and positioned further away from axle 300 (as depicted in FIG. 7B). Sliding wheel 220 may be secured to assembly 200 in the first position or second position, for example, by inserting locking key 240 into a set of slots 215 and slots 226 when slots 226 are aligned with the appropriate set of slots 215. In some embodiments, sliding wheel 220 may also be secured in place via a safety pin 250.

In order to shift sliding wheel from one position to a different position, safety pin 250 and/or locking key 240 may be removed from assembly 200. For example, safety pin 250 may be pulled out of a hole designated for safety pin 250 on assembly 200 and/or locking key 240 may be lifted up out of slots 226 on sliding wheel 220 and slots 215 on axle extension component 210. Sliding wheel 220 may then be slid to a different position. For example, sliding wheel 220 may be slid axially (e.g., on axle extension sleeve 214 of axle extension component 210) from a first position associated with a first railway track gauge (as depicted in FIG. 7A) to a second position associated with a second railway track gauge (as depicted in FIG. 7B). When shifted to a different position, sliding wheel 220 may again be secured by inserting locking key 240 into a set of slots 215 and slots 226 when slots 226 are aligned with a different set of slots 215 and/or safety pin 250 is re-inserted into the hole designated for safety pin 250 on assembly 200. The components of assembly 200 are described further herein with respect to FIGS. 8-12.

In various embodiments, axle extension component 210 of assembly 200 may include axle extension base 212, axle extension sleeve 214, and/or one or more other components. In various implementations, axle extension base 210 (described below with respect to FIG. 8) and axle extension sleeve 214 (described below with respect to FIG. 9) may together comprise axle extension component 210, which may function the same as or similar to axle extension component 110 described above with respect to at least FIG. 3). In various embodiments, axle extension component 210 may be configured to receive sliding wheel 220, wheel cover 230, locking key 240, and/or one or more other components, as described further herein.

Figure 8:
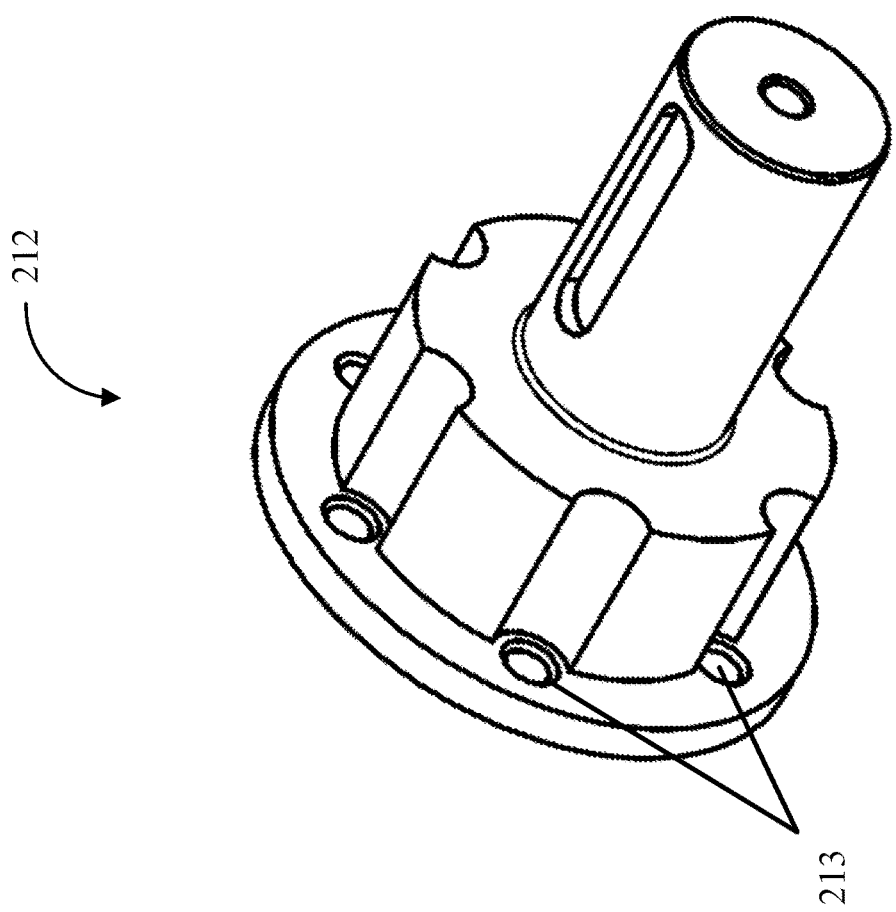
FIG. 8 depicts a perspective view of an example axle extension base of a dual gauge rail wheel assembly with a locking key, according to one or more aspects described herein.

FIG. 8 depicts a perspective view of axle extension base 212 of axle extension component 210 of dual gauge rail wheel assembly 200, according to one or more aspects described herein. In various embodiments, axle extension base 212 may include one or more axle connection holes 213 and/or one or more other components. In various embodiments, axle extension base 212 may comprise an internal component of assembly 200 that is configured to attach assembly 200 to axle 300. For example, axle extension base 212 may be configured to attach to axle 300 via one or more axle connection holes 213 as described herein with respect to one or more axle connection holes 112. In various embodiments, axle extension component 110 may be configured to receive axle extension sleeve 214 and/or one or more other components.

Figure 9:
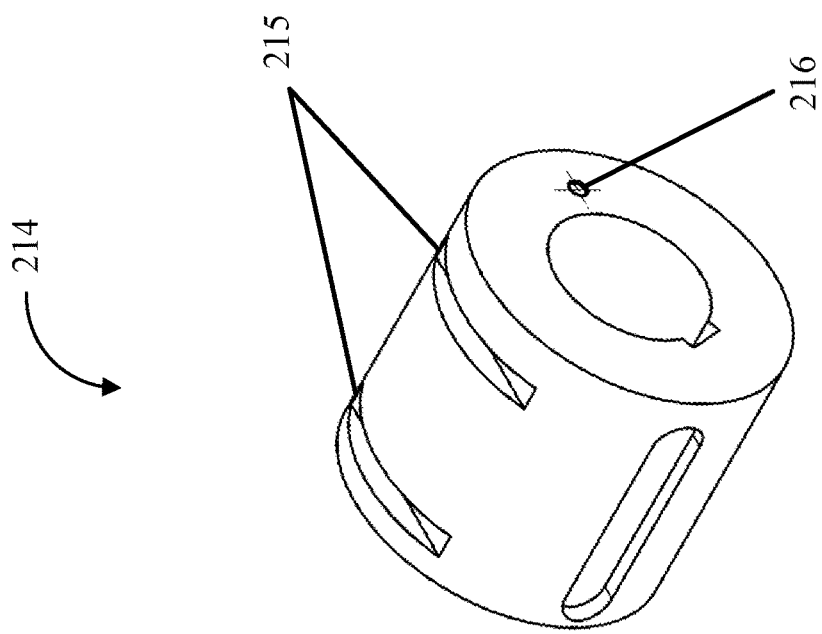
FIG. 9 depicts a perspective view of an example axle extension sleeve of a dual gauge rail wheel assembly with a locking key, according to one or more aspects described herein.

FIG. 9 depicts a perspective view of axle extension sleeve 214 of axle extension component 210 of dual gauge rail wheel assembly 200, according to one or more aspects described herein. In various embodiments, axle extension sleeve 214 may include slots 215 (which may also be referred to herein as "axle slots 215"), one or more cover holes 216, and/or one or more other components. In various embodiments, axle extension sleeve 214 may be configured to be slid onto axle extension base 212 at an end of axle extension base 212 opposite axle 300. For example, an internal diameter of axle extension sleeve 214 may correspond to (or be roughly equivalent to) an external diameter of axle extension base 212 at an end of axle extension base 212 opposite axle 300 such that axle extension sleeve 214 fits onto axle extension base 212. In some embodiments, axle extension sleeve 214 may be integrally joined with axle extension base 212. In various embodiments, slots 215 may comprise two or more sets of slots. In some embodiments, each set of slots may include two slots located on opposite sides of axle extension sleeve 214. In various embodiments, slots 215 may be configured to receive locking key 240. In various embodiments, a first set of slots 215 may be configured to correspond to a first position associated with a first railway track gauge (e.g., standard or European gauge), and a second set of slots 215 may be configured to correspond to a second position associated with a second railway track gauge (e.g., Iberian gauge). In various embodiments, axle extension sleeve 214 may be configured to enable axle extension component 210 to receive sliding wheel 220, wheel cover 230, locking key 240, and/or one or more other components. For example, axle extension sleeve 214 may be configured to receive at least sliding wheel 220, wheel cover 230, and locking key 240 as described further herein with respect to FIGS. 10-12.

Figure 10:
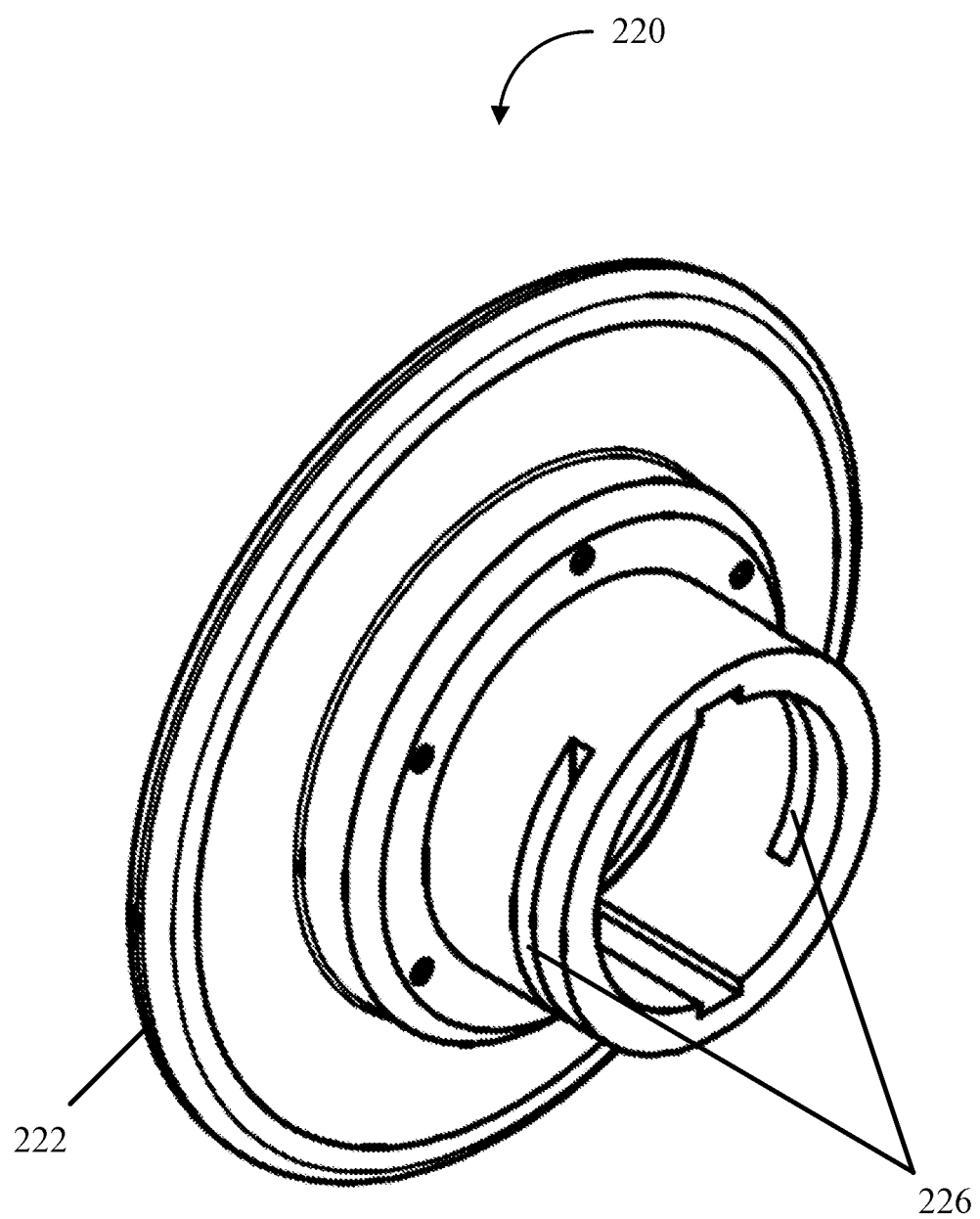
FIG. 10 depicts a perspective view of an example sliding wheel of a dual gauge rail wheel assembly with a locking key, according to one or more aspects described herein.

FIG. 10 depicts a perspective view of sliding wheel 220 of dual gauge rail wheel assembly 200, according to one or more aspects described herein. In various embodiments, sliding wheel 220 may include metal ring 222, rubber ring 224 (not pictured), slots 226 (which may also be referred to herein as "wheel slots 226"), and/or one or more other components. In various embodiments, sliding wheel 220 may be slid onto axle extension component 214 at an end of axle extension sleeve 214 opposite axle 300. For example, an internal diameter of sliding wheel 220 may correspond to (or be roughly equivalent to) an external diameter of axle extension sleeve 214 to enable axle extension sleeve 214 (and axle extension component 210) to receive sliding wheel 220. In various embodiments, metal ring 222 and rubber ring 224 may be the same as or similar to metal ring 122 and rubber ring 124, respectively. In various embodiments, slots 226 may comprise a set of two slots located on opposite sides of axle extension sleeve 214. In various embodiments, slots 226 may be configured to receive locking key 240. As described herein, slots 226 may be aligned with a first set of slots 215 that correspond to a first position associated with a first railway track gauge (e.g., standard or European gauge) to secure sliding wheel 220 in the first position via locking key 240, or may be aligned with a second set of slots 215 that correspond to a second position associated with a second railway track gauge (e.g., Iberian gauge) to secure sliding wheel 220 in the second position via locking key 240.

Figure 11:
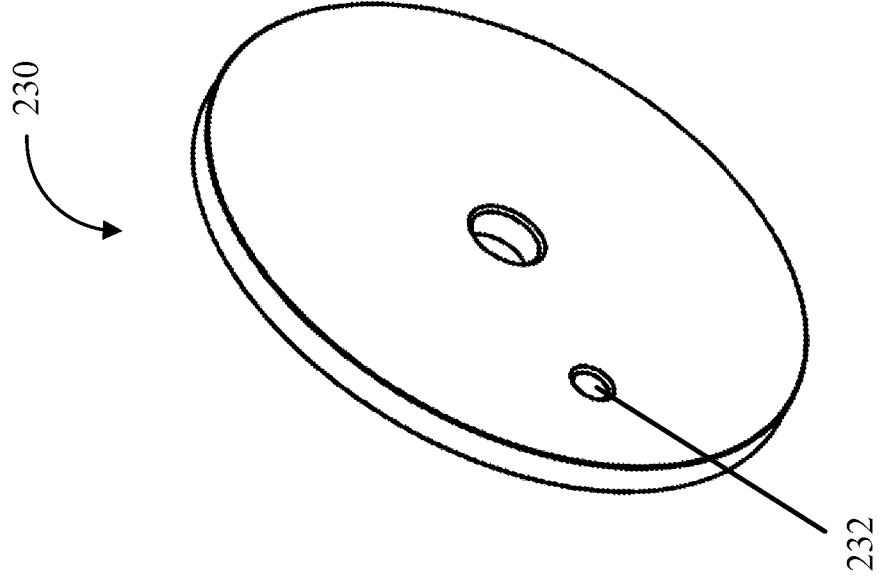
FIG. 11 depicts a perspective view of an example wheel cover of a dual gauge rail wheel assembly with a locking key, according to one or more aspects described herein.

FIG. 11 depicts a perspective view of wheel cover 230 of dual gauge rail wheel assembly 200, according to one or more aspects described herein. In various embodiments, wheel cover 230 may include one or more holes 232 and/or one or more other components. In various embodiments, wheel cover 230 may comprise an external component of assembly 200 opposite axle 300. In various embodiments, wheel cover 230 may be affixed to axle extension component 210 via one or more cover holes 216 located at an end of axle extension sleeve 214 opposite axle 300 when axle extension sleeve 214 is on axle extension base 212. For example, one or more holes 232 of wheel cover 230 may be aligned with one or more cover holes 216 to affix wheel cover 230 to axle extension component 210. In various embodiments, wheel cover 230 may be configured to secure one or more components of sliding wheel 220 to assembly 200 and/or protect internal components of assembly 200 or axle 300.

Figure 12:
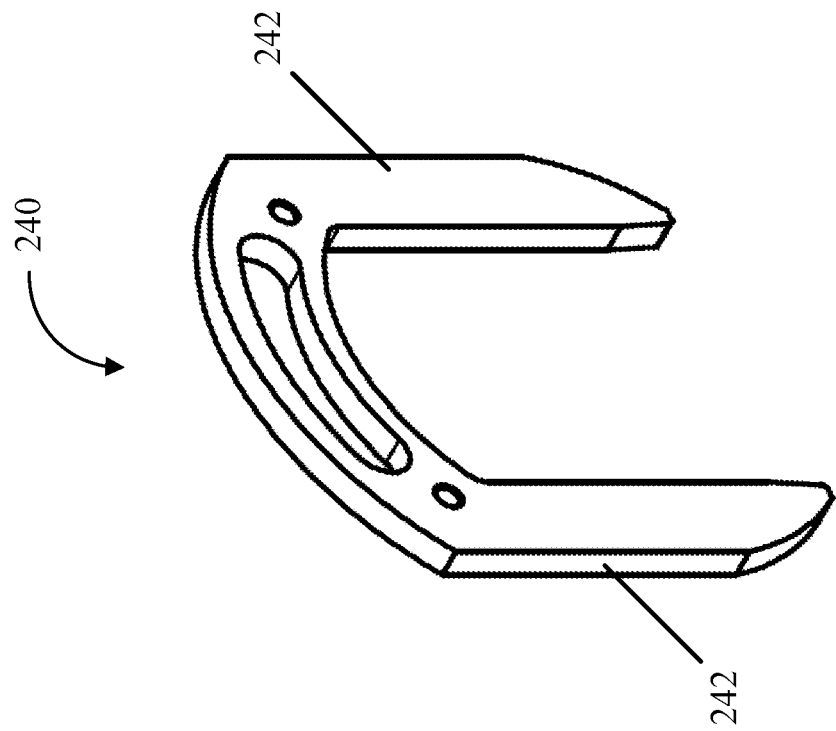
FIG. 12 depicts a perspective view of an example locking key of a dual gauge rail wheel assembly, according to one or more aspects described herein.

FIG. 12 depicts a perspective view of locking key 240 of dual gauge rail wheel assembly 200, according to one or more aspects described herein. In various embodiments, locking key 240 may comprise a pair of arms 242 separated by a handle. In various embodiments, locking key 240 may be configured to be slid onto sliding wheel 220 and axle extension component 210 by inserting arms 242 into slots formed by aligning slots of sliding wheel 220 (e.g., slots 226) and slots of axle extension component 210 (e.g., slots 215 of axle extension sleeve 214). As described herein, locking key 240 may be utilized to secure sliding wheel 220 in a first position associated with a first railway track gauge (e.g., standard or European gauge) when slots 226 are aligned with a first set of slots 215 that correspond to the first railway track gauge, and may be utilized to secure sliding wheel 220 in a second position associated with a second railway track gauge (e.g., Iberian gauge) when slots 226 are aligned with a second set of slots 215 that correspond to the second railway track gauge.

Figure 13:
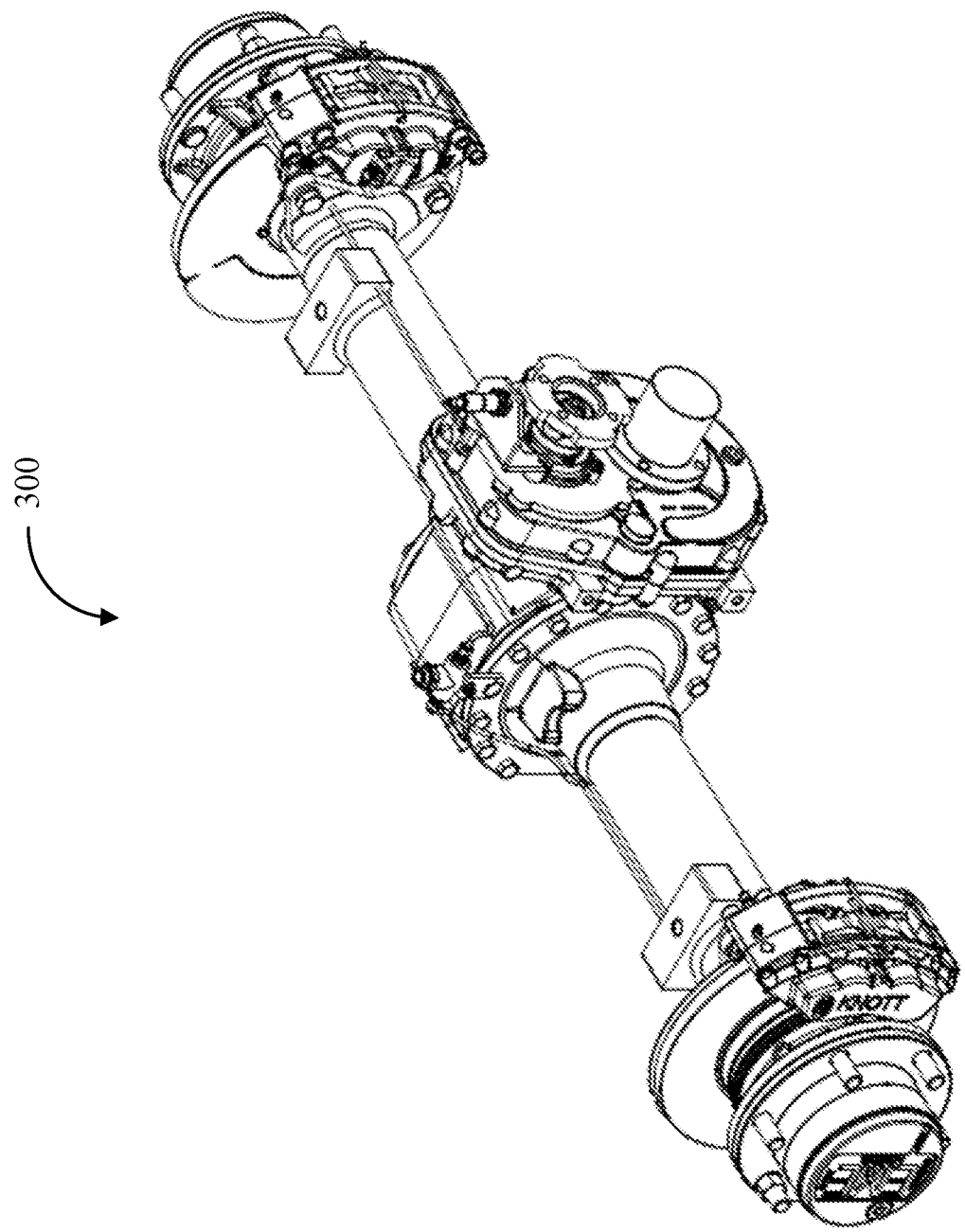
FIG. 13 depicts a perspective view of an example rail axle configured to receive a dual gauge rail wheel assembly, according to one or more aspects described herein.

FIG. 13 depicts a perspective view of a rail axle 300 configured to receive a dual gauge rail wheel assembly, according to one or more aspects described herein. For example, axle 300 may be configured to receive assembly 100, assembly 200, or a dual gauge rail wheel assembly comprising components of assembly 100, assembly 200, and/or one or more other components. In various embodiments, a dual gauge rail wheel assembly as described herein may be configured to be attached to axle 300 and/or one or more other rail axles now known or future developed. For example, in some embodiments, a dual gauge rail wheel assembly as described herein may be compatible with any rail axle that is compatible with a standard rail wheel.

As described herein, the sliding wheel of the rail wheel assembly (e.g., sliding wheel 120 of assembly 100 or sliding wheel 220 of assembly 200) may be configured to be slid axially (e.g., on an axle extension component). For example, the sliding wheel may be configured to be slid from a first position associated with a first railway track gauge to a second position associated with a second railway track gauge. In various implementations, the sliding wheel may be slid and/or positioned manually and/or by one or more other means. For example, the sliding wheel may be shifted to a position associated with a given railway track gauge using pneumatic, hydraulic, electric, electromagnetic, and/or other means. In such implementations, the mechanical locking mechanism (e.g., one or more locking pins 140 and/or locking key 240) may be replaced by one or more other means for securing the sliding wheel on the rail wheel assembly. For example, in some implementations, a pressure or electromagnetic locking system may be used to secure the sliding wheel on the rail wheel assembly.

The present disclosure is disclosed above and in the accompanying drawings with reference to a variety of examples. The purpose served by the disclosure, however, is to provide examples of the various features and concepts related to the disclosure, not to limit the scope of the invention. It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. For example, components and/or features of dual gauge rail wheel assembly 100 and dual gauge rail wheel assembly 200 may be combined as would be understood by a person having ordinary skill in the art. Accordingly, a dual gauge rail wheel assembly as described herein may comprise one or more components of dual gauge rail wheel assembly 100 and/or dual gauge rail wheel assembly 200. The embodiments described herein explain the best modes known for practicing the invention and will enable others skilled in the art to utilize the invention.

While the preferred embodiments of the invention have been shown and described, one skilled in the relevant art will recognize that numerous variations and modifications may be made to the examples described above without departing from the scope of the present disclosure. Thus, the spirit and scope of the invention should be construed broadly as set forth in the appended claims.

What is claimed is:

1. A rail wheel assembly for a railway vehicle configured to operate on a railway network with multiple railway track gauges, the rail wheel assembly comprising:
    an axle extension component affixed to an end of an axle of a railway vehicle such that the axle extension component extends axially from the end of the axle; and
    a sliding wheel configured to slide axially on the axle extension component between at least a first position and a second position and lock into place via a mechanical locking device, wherein the first position is associated with a first railway track gauge and the second position is associated with a second railway track gauge.

2. The rail wheel assembly of claim 1, wherein the railway vehicle comprises a railcar mover.

3. The rail wheel assembly of claim 1, wherein the first railway track gauge comprises a standard or European gauge and the second railway track gauge comprises an Iberian gauge.

4. The rail wheel assembly of claim 1, wherein the axle extension component is configured to receive the sliding wheel at an end of the axle extension component opposite the axle.

5. The rail wheel assembly of claim 1, wherein the mechanical locking device comprises a set of locking pins, wherein the axle extension component comprises two or more sets of axle holes, each set of axle holes comprising a first axle hole and a second axle hole located on opposite sides of the axle extension component and each configured to receive a locking pin, the two or more sets of axle holes comprising at least a first set of axle holes corresponding to the first position and a second set of axle holes corresponding to the second position, and wherein the sliding wheel comprises a set of wheel holes comprising a first wheel hole and a second wheel hole located on opposite sides of the sliding wheel and each configured to receive a locking pin.

6. The rail wheel assembly of claim 5, wherein when the first wheel hole is aligned with the first axle hole of the first set of axle holes and the second wheel hole is aligned with the second axle hole of the first set of axle holes, the set of wheel slots and the first set of axle slots are together configured to receive the set of locking pins to secure the sliding wheel in the first position associated with the first railway track gauge, and wherein when the first wheel hole is aligned with the first axle hole of the second set of axle holes and the second wheel hole is aligned with the second axle hole of the second set of axle holes, the set of wheel slots and the second set of axle slots are together configured to receive the set of locking pins to secure the sliding wheel in the second position associated with the second railway track gauge.

7. The rail wheel assembly of claim 1, wherein the mechanical locking device comprises a locking key, wherein the axle extension component comprises two or more sets of axle slots, each set of axle slots comprising two slots located on opposite sides of the axle extension component and together configured to receive a locking key, the two or more sets of axle slots comprising at least a first set of axle slots corresponding to the first position and a second set of axle slots corresponding to the second position, and wherein the sliding wheel comprises a set of wheel slots comprising two slots located on opposite sides of the sliding wheel and together configured to receive a locking key.

8. The rail wheel assembly of claim 7, wherein when the set of wheel slots is aligned with the first set of axle slots, the set of wheel slots and the first set of axle slots are together configured to receive the locking key to secure the sliding wheel in the first position associated with the first railway track gauge, and wherein when the set of wheel slots is aligned with the second set of axle slots, the set of wheel slots and the second set of axle slots are together configured to receive the locking key to secure the sliding wheel in the second position associated with the second railway track gauge.

9. The rail wheel assembly of claim 1, wherein the axle extension component comprises an axle extension base and an axle extension sleeve.

10. The rail wheel assembly of claim 9, wherein the axle extension component is affixed to the axle of the railway vehicle via one or more holes on the axle extension base.

11. The rail wheel assembly of claim 10, wherein the axle extension base is configured to receive the axle extension sleeve at an end of the axle extension base opposite the axle.

12. The rail wheel assembly of claim 9, wherein the axle extension sleeve is integrally joined with the axle extension base.

13. The rail wheel assembly of claim 9, wherein an internal diameter of the sliding wheel corresponds to an external diameter of the axle extension sleeve.

14. The rail wheel assembly of claim 1, wherein the axle extension component includes one or more cover holes located on an end of the axle extension component opposite the axle, and wherein the rail wheel assembly further comprises a wheel cover affixed to the end of the axle extension component opposite the axle via the one or more cover holes.

15. The rail wheel assembly of claim 1, wherein the sliding wheel is further secured in place via a safety pin.

16. The rail wheel assembly of claim 1, wherein when locked in the first position, the sliding wheel is configured to be unlocked and slid from the first position to the second position without requiring additional equipment or a gauge changing facility.

17. The rail wheel assembly of claim 1, wherein the axle extension component comprises one or more first holes, wherein the distal side of the axle comprises one or more second holes, wherein the one or more first and second holes are aligned.

18. The rail wheel assembly of claim 1, wherein the axle extension component comprises a longitudinal body.

19. The rail wheel assembly of claim 1, wherein the sliding wheel slides directly onto the axle extension component.

* * * * *